United States Patent
Wilson

(10) Patent No.: US 7,099,688 B2
(45) Date of Patent: Aug. 29, 2006

(54) COMBINED LOW-IF/DIRECT DOWN CONVERSION BASEBAND ARCHITECTURE FOR 3G GSM/WCDMA RECEIVERS

(75) Inventor: Duane Wilson, Morgan Hill, CA (US)

(73) Assignee: Matsushita Electric Industrial Co., Ltd., Cupertino, CA (US)

( * ) Notice: Subject to any disclaimer, the term of this patent is extended or adjusted under 35 U.S.C. 154(b) by 988 days.

(21) Appl. No.: 10/013,209

(22) Filed: Dec. 7, 2001

(65) Prior Publication Data

US 2003/0109276 A1    Jun. 12, 2003

(51) Int. Cl.
*H04M 1/00* (2006.01)
*H04B 1/26* (2006.01)

(52) U.S. Cl. .................. 455/552.1; 455/323

(58) Field of Classification Search ............ 455/552.1, 455/550.1, 324, 323
See application file for complete search history.

(56) References Cited

U.S. PATENT DOCUMENTS

| | | | |
|---|---|---|---|
| 6,029,052 A * | 2/2000 | Isberg et al. | 455/131 |
| 6,931,241 B1 * | 8/2005 | Khlat et al. | 455/137 |
| 2003/0022652 A1 * | 1/2003 | Stepp et al. | 455/323 |
| 2003/0087613 A1 * | 5/2003 | Bellaouar et al. | 455/91 |
| 2003/0100286 A1 * | 5/2003 | Severson et al. | 455/324 |

\* cited by examiner

*Primary Examiner*—Barry Taylor

(57) ABSTRACT

A radio receiver for receiving signals of at least two different communication standards, including a narrow band signal having a narrow bandwidth and a wide band signal having a wide bandwidth, is provided. The receiver comprises a shared radio frequency (RF) front-end that receives the wide band signal during at least one period of operation, downconverts, in a single downconversion, the wide band signal directly to baseband, receives the narrow band signal during at least another period of operation, and downconverts, in a single downconversion, the narrow band signal to a low intermediate frequency (Low-IF). The receiver further comprises a baseband processing chain that operates on the downconverted wide band signal to extract desired data and a Low-IF processing chain that operates on the downconverted narrow band signal to extract desired data.

20 Claims, 2 Drawing Sheets

COMBINED LOW-IF/DIRECT DOWN CONVERSION BASEBAND ARCHITECTURE FOR 3G GSM/WCDMA RECEIVERS

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates to the mobile communication receivers and more specifically to a multiple-mode mobile communication receiver capable of processing signals of distinct communication standards.

As different competing standards of mobile communications become available, there is an increasing need for devices capable of operating with multiple communication standards. Such "multiple-mode" devices are able to communicate with using one standard at a particular time, and switch to operate using another standard at another time as needed.

FIG. 1 illustrates the basic concept of "multiple-mode" operation. A mobile device 102 is capable of communicating with a first base station 104 and a second base station 106, which are built for different standards of communication. At some point in time, the mobile device 102 communicates with the base station 104, using a first communication standard. At another point in time, the mobile device switches its operation to communicate with the second base station, using a second communication standard. Thus, as the device 102 has an increased range of operation, because it is able to communicate while within the coverage area of base stations using the first communication standard as well the coverage area of base stations using the second communication standard.

Multiple-mode devices such as the one described above have been built using various designs. One design is simply to combine what are essentially two or more separate devices, each capable of communication using a different standard. Other designs have also attempted to combine such separate devices, but with some resources being shared between the separate devices. Such sharing of resources allows improvements in size, cost, power consumption, and/or other considerations.

However, as newer communication standards are developed, more complex and specialized implementations of advanced standards make it especially challenging to find feasible solutions for efficiently combining inherently dissimilar devices. Specifically, one increasingly popular communication standard is generally referred to as Global System for Mobile Communications (GSM). The GSM standard includes 2.5G, 3G, EGSM, EDGE, GPRS, and others. Another increasingly popular communication standard is generally referred to as wide band code division multiple access (WCDMA). The WCDMA standard includes UMTS, CDMA, and others.

Thus, there is a need for an improved strategy for building multiple-mode devices capable of supporting more than one of the more advanced communication standards, such as GSM and WCDMA, that accommodates different implementations required by such standards.

BRIEF SUMMARY OF THE INVENTION

A radio receiver for receiving signals of at least two different communication standards, including a narrow band signal having a narrow bandwidth and a wide band signal having a wide bandwidth, is provided. The receiver comprises a shared radio frequency (RF) front-end that receives the wide band signal during at least one period of operation, downconverts, in a single downconversion, the wide band signal directly to baseband, receives the narrow band signal during at least another period of operation, and downconverts, in a single downconversion, the narrow band signal to a low intermediate frequency (Low-IF). The receiver further comprises a baseband processing chain that operates on the downconverted wide band signal to extract desired data and a Low-IF processing chain that operates on the downconverted narrow band signal to extract desired data.

In one embodiment, the shared RF front-end is formed on a first integrated circuit, and the baseband processing chain and Low-IF processing chain are formed on a second integrated circuit. According to the embodiment, the shared RF front-end, baseband processing chain and Low-IF processing chain are formed using CMOS technology.

DETAILED DESCRIPTION OF THE INVENTION

Figure 1:
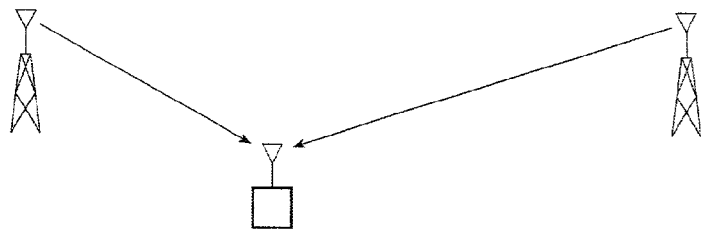
FIG. 1 illustrates the concept of "multiple-mode" operation.
Figure 2:
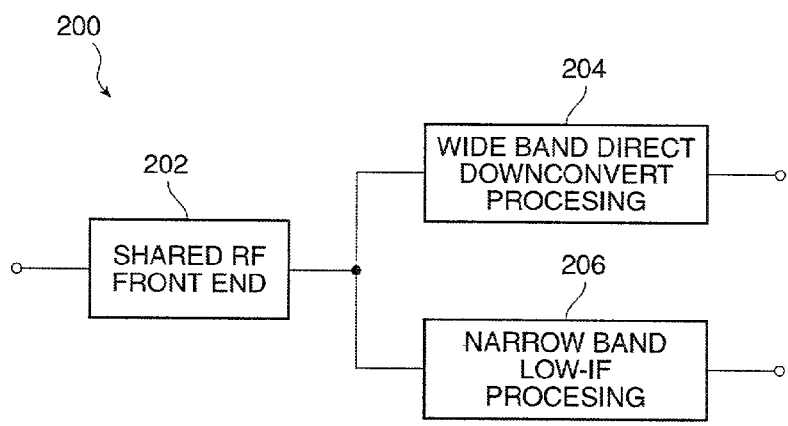
FIG. 2 is a block diagram of the basic structure of a multi-mode mobile communications receiver in accordance with one embodiment the present invention.

FIG. 2 is a block diagram of the basic structure of a multi-mode mobile communications receiver 200 in accordance with one embodiment the present invention. The receiver 200 is capable of receiving a wide band radio frequency (RF) signal based on a first communication standard during one period of signal reception. The receiver 200 is capable of receiving a narrow band RF signal based on a second communication standard during a different period of signal reception. The receiver 200 includes a shared radio RF front end 202 for receiving RF signals corresponding to either the first or the second communication standard. The shared RF front end 202 is connected to a Wide Band Baseband Processing Chain 204 and to a Narrow Band Low-IF Processing Chain 206. This may be a switchable connection (not shown) that connects to either the Wide Band Baseband Processing Chain 204 or to the Narrow Band Low-IF Processing Chain 206.

During a signal reception period in which a wide band RF signal is received, the shared RF front end 202 receives the wide band RF signal and performs a direct downconversion of the wide band RF signal down to baseband. More specifically, the shared RF front end 202, converts the wide band RF signal from a RF frequency location in the frequency spectrum down to 0 Hz. This produces a wide band baseband signal with a center frequency of 0 Hz. The wide band baseband signal is provided to the Wide Band Baseband Processing Chain 204.

Figure 3A:
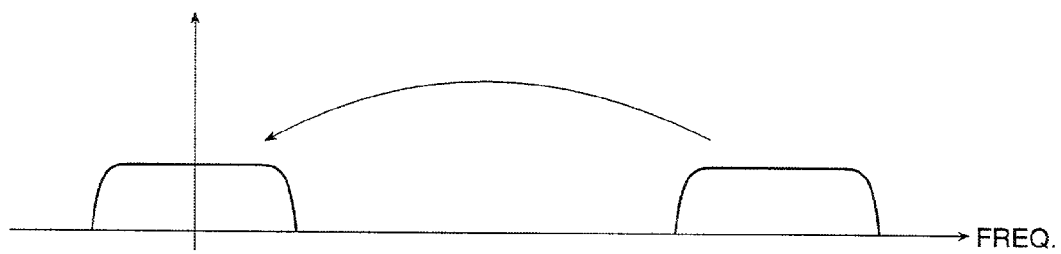
FIG. 3A is an example frequency spectrum plot illustrating direct downconversion in accordance with the embodiment discussed above.

FIG. 3A is an example frequency spectrum plot illustrating the direct downconversion discussed above. Here, a wide band RF signal 302 having a bandwidth roughly in the MHz range is located on the frequency spectrum in the GHz range. The signal is downconverted into a wide band baseband signal having the same bandwidth but now centered at 0 Hz.

Referring back to FIG. 2, during another signal reception period in which a narrow band RF signal is received, the shared RF front end 202 receives the narrow band RF signal and performs a downconversion of the narrow band RF signal down to a low intermediate frequency (Low-IF). The Low-IF frequency can also be referred to as near baseband. Typically, the Low-IF frequency is no more than a few times the bandwidth of the narrow band RF signal. This produces a narrow band Low-IF signal with a center frequency greater than 0 Hz. The narrow band Low-IF signal is provided to the Narrow Band Low-IF Processing Chain 206.

Figure 3B:
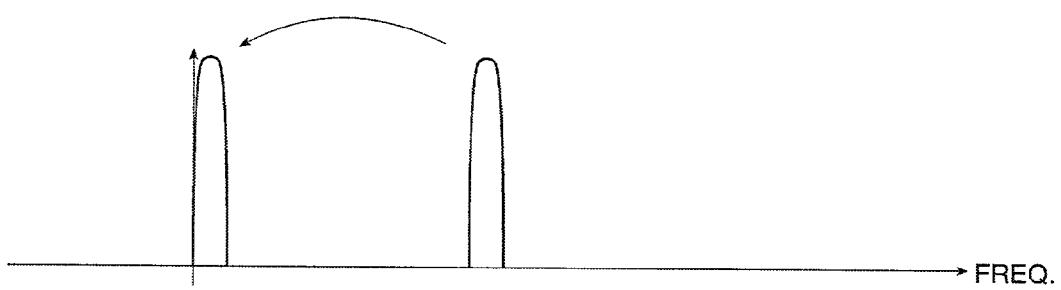
FIG. 3B is an example frequency spectrum plot illustrating downconversion to Low-IF frequency in accordance with the embodiment discussed above.

FIG. 3B is an example frequency spectrum plot illustrating the downconversion to a Low-IF frequency discussed above. Here, a narrow band RF signal having a bandwidth roughly in the KHz range is located on the frequency spectrum in the GHz range. The signal is downconverted into a narrow band Low-IF signal having the same bandwidth but now centered at a frequency in the KHz range. Note that here the downconverted signal is not centered at 0 Hz. That is, it is not at baseband.

Figure 4:
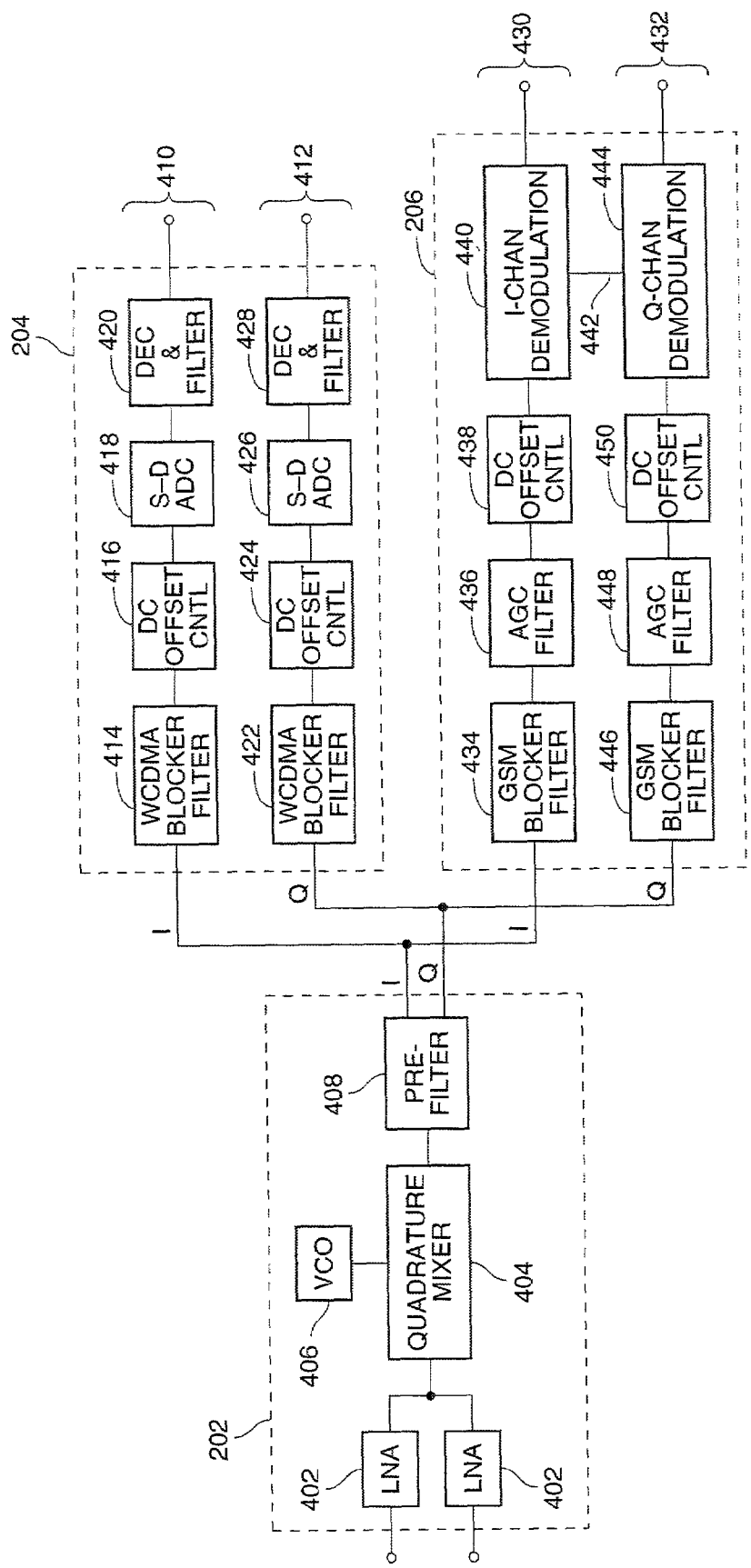
FIG. 4 is a detailed block diagram of one implementation of the multi-mode mobile communications receiver according to one embodiment the present invention.

FIG. 4 is a detailed block diagram of one implementation of the multi-mode mobile communications receiver 200 in accordance with one embodiment the present invention. As in FIG. 2, the shared RF front end 202 is connected to a Wide Band Baseband Processing Chain 204 and to a Narrow Band Low-IF Processing Chain 206. This may be a switchable connection (not shown) that connects to either the Wide Band Baseband Processing Chain 204 or to the Narrow Band Low-IF Processing Chain 206. Here, the connection is in the form of an I channel and a Q channel utilized in quadrature signaling, such as Quadrature Phase Shift Keying (QPSK), Quadrature Amplitude Modulation (QAM), and others.

The shared RF front end 202 is capable of receiving wide band RF signals or narrow band RF signals, from a wide range of RF frequencies. As shown here, the shared RF front end 202 is capable of receiving a wide band signal belonging to the general category of Wide band code division multiple access (WCDMA) signal. The shared RF front end 202 is also capable of receiving a narrow band signal belonging to the general category of Global System for Mobile Communications (GSM) signals. The shared RF front end 202 downconverts such a WCDMA signal from RF directly down to baseband. The shared RF front end 202 downconverts such a GSM signal from RF down to a Low-IF frequency.

Note that conversion of the GSM signal from RF to particular Low-IF frequencies, such as 100 KHz, takes advantage of the reduced image rejection requirement provided by standards consistent with the GSM category. Such standards reduce transmission signal power in a neighboring band of signals, allowing this reduced image rejection requirement.

Here, the shared RF front end 202 includes a number of low noise amplifiers (LNA) 402 for amplifying received RF signals from a wide range of RF frequencies. For example, a particular WCDMA signal may be received at an RF frequency in the approximate range of 2 GHz. Such a received RF signal may be amplified by one of the LNAs 402. Another WCDMA signal may be received at an RF frequency in the approximate range of 1 GHz. Such a received RF signal may be amplified by a different one of the LNAs 402. Thus, the outputs of the LNAs 402 may be connected in parallel in a switchable manner (not shown) so that the appropriate amplifier can be used to perform the necessary amplification operation. Similarly, a GSM signal may be received at an RF frequency in the approximate range of 2 GHz, 1 GHz, or others, and an appropriate one of the LNAs 402 may be used to amplify the GSM signal.

After amplification by one of the LNAs 402, the received RF signal is provided to a mixer 404 for the appropriate frequency downconversion. In a preferred embodiment, the mixer 404 is a quadrature mixer. If the received RF signal is a wide band WCDMA signal, the mixer 404 downconverts the signal from its RF frequency directly down to baseband. If the received RF signal is narrow band GSM signal, the mixer 404 downconverts the signal from its RF frequency to a Low-IF frequency. A voltage controlled oscillator 406 or some other source provides a reference oscillation signal to the mixer 404 to facility the appropriate downconversion. According to a preferred embodiment of the invention, the mixer 404 performs necessary downconversion from RF to either baseband or a Low-IF frequency, in a single downconversion step.

The mixer 404 provides the appropriately downconverted signal, which can be a wide band WCDMA baseband signal or a narrow band GSM Low-IF signal, to a pre-filter block 408. The pre-filter block 408 performs a series of amplification and filtering functions that condition the downconverted signal while rejecting close-in blocking signals. The pre-filter block 408 produces a signal that is connected the Wide Band Baseband Processing Chain 204 and to the Narrow Band Low-IF Processing Chain 206. As discussed above, this connection is in the form of an I channel and a Q channel utilized in quadrature signaling. It may be a switchable connection (not shown) that connects to either the Wide Band Baseband Processing Chain 204 or to the Narrow Band Low-IF Processing Chain 206.

The Wide Band Baseband Processing Chain 204 includes an I channel path 410 and a similarly structured Q channel path 412. The I channel path 410 includes, in serial connection, a WCDMA blocker filter 414, a DC offset control block 416, an analog to digital converter 418, and a decimate and filter block 420. The I channel of the wide band WCDMA baseband signal is provided by the pre-filter block 408 to the WCDMA blocker filter 414. The WCDMA blocker filter 414 performs a low-pass, wide bandwidth filtering function to this I channel signal, to present the proper baseband signal for further processing.

The WCDMA blocker filter 414 provides its output to the DC offset control block 416. Since signals are processed at baseband in the Wide Band Baseband Processing Chain 204, these signals are particularly vulnerable to introduction of undesired DC offset components. The DC offset control block 416 provides correction to counter such unwanted DC effects. The DC offset control block 416 provides its output to the analog to digital converter 418. Note that the DC offset control block 416 may be located at an alternative location along the I channel path 410. Furthermore, although the DC offset control block 416 is shown as the only DC offset control block in the I channel path 410, other DC offset control block(s) can be distributed along in the I channel path 410 at various additional and/or alternative locations.

In a preferred embodiment, the analog to digital converter 418 is a Sigma-Delta analog to digital converter. The digitized output of the analog to digital converter 418 is provided to the decimate and filter block 420. Since the signal is already in baseband, no further demodulation is necessary. Thus, the decimate and filter block 420 performs sampling, decimation, filtering, and/or similar techniques to extract the desired information from the signal. The decimate and filter block 420 outputs an I channel information signal that represents the final I channel output of the Wide Band Baseband Processing Chain 204.

The Q channel path 412 of the Wide Band Baseband Processing Chain 204 includes, in serial connection, a WCDMA blocker filter 422, a DC offset control block 424, an analog to digital converter 426, and a decimate and filter block 428. These elements are arranged in similar fashion and perform similar functions as corresponding elements already discussed above in the I channel path 410 of the Wide Band Baseband Processing Chain 204. Thus, after processing similar to those discussed above with respect to the I channel path 410, the decimate and filter block 420 outputs an I channel information signal that represents the final I channel output of the Wide Band Baseband Processing Chain 204.

The Narrow Band Low-IF Processing Chain 206 includes an I channel path 430 and a similarly structured Q channel path 432. The I channel path 430 includes, in serial connection, a GSM blocker filter 434, an automatic gain control (AGC) filter 436, a DC offset control block 438, and an I-channel demodulation block 440. The I channel of the narrow band GSM Low-IF signal is provided by the prefilter block 408 to the GSM blocker filter 434. The GSM blocker filter 434 performs a bandpass, narrow bandwidth filtering function to this I channel signal, to present the proper Low-IF signal for further processing.

The GSM blocker filter 434 provides its output to the AGC filter 436. The AGC filter 436 performs an appropriate gain adjustment to the signal and provides its output to the DC offset control block 438. The DC offset control block 438 performs a correction to compensate for undesired DC offset effects in the signal. The DC offset control block 438 provides its output to the I channel demodulation block 434. Note that the DC offset control block 438 may be located at an alternative location along the I channel path 430. Furthermore, although the DC offset control block 438 is shown as the only DC offset control block in the I channel path 430, other DC offset control block(s) can be distributed along in the I channel path 430 at various additional and/or alternative locations.

The I channel demodulation block 434 performs demodulation on the narrow band GSM Low-IF signal that has been processed as discussed above. Numerous demodulation techniques are possible, depending on the implementation and on the particular modulation scheme involved. A connection 442 is shown between the I channel demodulation block 440 and a Q channel demodulation block 444. Here, the connection 442 illustrates that I channel demodulation is not performed independently of Q channel demodulation. Note that the connection 442 can represent either a single connection or a number of connections between the demodulator blocks 440 and 444. Also, it should be noted that other implementations in accordance with the present invention may be constructed in which I channel demodulation is performed independently of Q channel demodulation. The I channel demodulation block 434 produces an I channel information signal that represents the final I channel output of the Narrow Band Low-IF Processing Chain 206.

The Q channel path 432 of the Narrow Band Low-IF Processing Chain 206 includes, in serial connection, a GSM blocker filter 446, an automatic gain control (AGC) filter 448, a DC offset control block 450, and the above-mentioned Q-channel demodulation block 444. These elements are arranged in similar fashion and perform similar functions as corresponding elements already discussed above in the I channel path 430 of the Narrow Band Low-IF Processing Chain 206. Thus, after processing similar to those discussed above with respect to the I channel path 430, the Q channel demodulation block 444 produces a Q channel information signal that represents the final Q channel output of the Narrow Band Low-IF Processing Chain 206.

In accordance with a preferred embodiment of the present invention, the Wide Band Baseband Processing Chain 204 and the Narrow Band Low-IF Processing Chain 206 are implemented as circuit structures on a common integrated circuit, and the shared RF front end 202 is implemented as a circuit structure on a separate integrated circuit. In this preferred embodiment, the integrated circuits are constructed using CMOS technology.

In other embodiments, other combinations of integrated circuits can be used to implement the shared RF front end 202, the Wide Band Baseband Processing Chain 204, and the Narrow Band Low-IF Processing Chain 206. Also, in other embodiments, the integrated circuits can be constructed using other technologies or in combination with other technologies. Such technologies include BiCMOS, Gallium Arsenide (GaAs), and/or others.

Also within a preferred embodiment of the present invention, some or all of the signal paths shown in FIGS. 2 and 4 are implemented using a differential circuit topology. That is, the signals of interest are processed differentially as opposed to in a single-ended fashion.

Although the present invention has been described in terms of specific embodiments, it should be apparent to those skilled in the art that the scope of the present invention is not limited to the described specific embodiments.

The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A radio receiver for receiving signals of at least two different communication standards, including a narrow band signal having a narrow bandwidth and a wide band signal having a wide bandwidth, comprising:

a shared radio frequency (RF) front-end, said shared RF front-end receiving said wide band signal during at least one period of operation and downconverting, in a single downconversion, said wide band signal directly to baseband, said shared RF front-end receiving said narrow band signal during at least another period of operation and downconverting, in a single downconversion, said narrow band signal to a low intermediate frequency (Low-IF) no more than a few times the bandwidth of the narrow band signal;

a baseband processing chain coupled to said shared RF front-end and operating on said downconverted wide band signal to extract desired data from said downconverted wide band signal; and a Low-IF processing chain, separate from the baseband processing chain, coupled to said shared RF front-end in parallel to said baseband processing chain and operating on said downconverted narrow band signal to extract desired data from said downconverted narrow band signal.

2. The apparatus of claim 1 wherein said wide band signal is a wide band code division multiple access (WCDMA) type signal.

3. The apparatus of claim 1 wherein said narrow band signal is a Global System for Mobile Communications (GSM) type signal.

4. The apparatus of claim 1 wherein said downconverted wide band signal is a quadrature signal having an I channel and a Q channel.

5. The apparatus of claim 1 wherein said downconverted narrow band signal is a quadrature signal having an I channel and a Q channel.

6. The apparatus of claim 1 wherein said baseband processing chain and said Low-IF processing chain are formed on a single integrated circuit.

7. The apparatus of claim 6 wherein said shared RF front-end is formed on a different integrated circuit.

8. The apparatus of claim 1 wherein said shared RE front-end, baseband processing chain and Low-IF processing chain are formed on a single integrated circuit.

9. The apparatus of claim 1 wherein said shared RF front-end, baseband processing chain and Low-IF processing chain are formed using CMOS technology.

10. The apparatus of claim 1 wherein said shared RF front-end, baseband processing chain and Low-IF processing chain are formed using BiCMOS technology.

11. The apparatus of claim 1 wherein said shared RF front-end, baseband processing chain and Low-IF processing chain are formed using Silicon Germanium (SiGe) technology.

12. The apparatus of claim 1 wherein said shared RF front-end, baseband processing chain and Low-IF processing chain are formed using Gallium Arsenide (GaAs) technology.

13. The apparatus of claim 1 wherein said shared RF front-end further comprises: a plurality of low noise amplifiers (LNA) in parallel connection with one another; a mixer connected in series with said plurality of LNAs; a voltage controlled oscillator (VCO) providing a oscillating reference signal to said mixer; and a pre-filter block connected in series with said mixer, said pre-filter block performing amplification and filtering functions.

14. The apparatus of claim 13 wherein each of said plurality of LNAs is capable of amplifying a different frequency range of RF signals.

15. The apparatus of claim 1, said baseband processing chain further comprising: a baseband blocker filter; a DC offset control circuit connected in series with said baseband blocker filter; and an analog to digital converter connected in series with said DC offset control circuit.

16. A radio receiver for receiving signals of at least two different communication standards, including a narrow band signal having a narrow bandwidth and a wide band signal having a wide bandwidth, comprising:

a shared radio frequency (RE) front-end, said shared RF front-end receiving said wide band signal during at least one period of operation and downconverting, in a single downconversion, said wide band signal directly to baseband, said shared RE front-end receiving said narrow band signal during at least another period of operation and downconverting, in a single downconversion, said narrow band signal to a low intermediate frequency (Low-IF) no more than a few times the bandwidth of the narrow band signal:

a baseband processing chain coupled to said shared RE front-end and operating on said downconverted wide band signal to extract desired data from said downconverted wide band signal, said baseband processing chain comprising: a first and a second baseband blocker filter; a first and a second DC offset control circuit connected in series with said first and second baseband blocker filters, respectively; and a first and a second analog to digital converter connected in series with said first and second DC offset control circuits, respectively, wherein said first baseband blocker filter, first DC offset control circuit, and first analog to digital converter form an I channel path of said baseband processing chain, and wherein said second baseband blocker filter, second DC offset control circuit, and second analog to digital converter form a Q channel path of said baseband processing chain; and a Low-IF processing chain coupled to said shared RF front-end and operating on said downconverted narrow band signal to extract desired data from said downconverted narrow band signal.

17. The apparatus of claim 1, said Low-IF processing chain further comprising: a Low-IF blocker filter; an automatic gain control (AGC) filter connected in series with said Low-IF blocker filter; a DC offset control circuit connected in series with said AGC filter; and a demodulator connected in series with said DC offset control circuit.

18. A radio receiver for receiving signals of at least two different communication standards, including a narrow band signal having a narrow bandwidth and a wide band signal having a wide bandwidth, comprising:

a shared radio frequency (RF) front-end, said shared RF front-end receiving said wide band signal during at least one period of operation and downconverting, in a single downconversion, said wide band signal directly to baseband, said shared RF front-end receiving said narrow band signal during at least another period of operation and downconverting, in a single downconversion, said narrow band signal to a low intermediate frequency (Low-IF) no more than a few times the bandwidth of the narrow band signal;

a baseband processing chain coupled to said shared RF front-end and operating on said downconverted wide band signal to extract desired data from said downconverted wide band signal; and a Low-IF processing chain coupled to said shared RE front-end and operating on said downconverted narrow band signal, operable to extract desired data from said downconverted narrow band signal, said Low-IF processing chain comprising: a first and a second Low-IF blocker filter; a first and a second automatic gain control (AGC) filter connected in series with said first and second Low-IF blocker filters, respectively; a first and a second DC offset control circuit connected in series with said first and second AGC filters, respectively; and a first and a second demodulator connected in series with said first and second DC offset control circuits, respectively, wherein said first Low-IF blocker filter, first AGC filter, first DC offset control circuit, and first demodulator form an I channel path of said Low-IF processing chain, and wherein said second Low-IF blocker filter, second AGC filter, second DC offset control circuit, and second demodulator form a Q channel path of said Low-IF processing chain.

19. A method for receiving signals of at least two different communication standards, including a narrow band signal having a narrow bandwidth and a wide band signal having a wide bandwidth, comprising:
  receiving said wide band signal during at least one period of operation at a shared radio frequency (RF) front-end;
  downconverting at said shared RF front-end, in a single downconversion, said wide band signal directly to baseband;
  receiving said narrow band signal during at least another period of operation at said shared RF front-end receiving;
  downconverting at said shared RF front-end, in a single downconversion, said narrow band signal to a low intermediate frequency (Low-IF) no more than a few times the bandwidth of the narrow band signal;
  at a baseband processing chain coupled to said shared RF front-end, operating on said downconverted wide band signal to extract desired data from said downconverted wide band signal; and
  at a Low-IF processing chain separate from said baseband processing chain and coupled to said shared RE front-end in parallel with said baseband processing chain, operating on said downconverted narrow band signal to extract desired data from said downconverted narrow band signal.

20. A system for receiving signals of at least two different communication standards, including a narrow band signal having a narrow bandwidth and a wide band signal having a wide bandwidth, comprising:
  means for receiving said wide band signal during at least one period of operation at a shared radio frequency (RF) front-end; means for downconverting at said shared RF front-end, in a single downconversion, said wide band signal directly to baseband; means for receiving said narrow band signal during at least another period of operation at said shared RF front-end receiving; means for downconverting at said shared RF front-end, in a single downconversion, said narrow band signal to a low intermediate frequency (Low-IF) no more than a few times the bandwidth of the narrow band signal;
  means for a baseband processing chain coupled to said shared RF front-end, operating on said downconverted, wide band signal to extract desired data from said downconverted wide band signal; and
  means for a Low-IF processing chain, separate from said means for baseband processing, coupled to said shared RF frontend in parallel with said baseband processing chain, operating on said downconverted narrow band signal to extract desired data from said downconverted narrow band signal.

* * * * *